US010075364B2

(12) United States Patent
Hao et al.

(10) Patent No.: US 10,075,364 B2
(45) Date of Patent: Sep. 11, 2018

(54) METHOD AND APPARATUS FOR SELF-TUNED ADAPTIVE ROUTING

(71) Applicant: Alcatel-Lucent USA Inc., Murray Hill, NJ (US)

(72) Inventors: Fang Hao, Morganville, NJ (US); Murali Kodialam, Marlboro, NJ (US); Tirunell V. Lakshman, Marlboro, NJ (US)

(73) Assignee: ALCATEL-LUCENT, Boulogne-Billancourt (FR)

( * ) Notice: Subject to any disclaimer, the term of this patent is extended or adjusted under 35 U.S.C. 154(b) by 211 days.

(21) Appl. No.: 14/716,646

(22) Filed: May 19, 2015

(65) Prior Publication Data

US 2016/0344615 A1 Nov. 24, 2016

(51) Int. Cl.
| | | |
|---|---|---|
| *G06F 15/173* | (2006.01) | |
| *H04L 12/733* | (2013.01) | |
| *H04L 12/721* | (2013.01) | |
| *H04L 12/24* | (2006.01) | |
| *H04L 12/26* | (2006.01) | |

(52) U.S. Cl.
CPC ........ *H04L 45/122* (2013.01); *H04L 41/0896* (2013.01); *H04L 43/0882* (2013.01); *H04L 45/124* (2013.01)

(58) Field of Classification Search
USPC ........................................................ 709/241
See application file for complete search history.

(56) References Cited

U.S. PATENT DOCUMENTS

| | | | | |
|---|---|---|---|---|
| 2004/0233850 | A1* | 11/2004 | Randriamasy | H04L 45/12 370/238 |
| 2007/0076601 | A1* | 4/2007 | Wang | H04L 41/083 370/229 |
| 2008/0181118 | A1* | 7/2008 | Sharma | H04L 45/02 370/238 |
| 2012/0008503 | A1* | 1/2012 | Qiu | H04L 43/0882 370/238 |
| 2012/0195204 | A1* | 8/2012 | Patel | H04L 45/00 370/237 |

(Continued)

FOREIGN PATENT DOCUMENTS

WO 20080077282 A1 7/2008

OTHER PUBLICATIONS

David Oran, Editor, "OSI IS-IS Intra—domain Routing Protocol", RFC:1142, Network Working Group, Digital Equipment Corp., Feb. 1990, 157 pages, in 2 parts.

(Continued)

*Primary Examiner* — Vivek Srivastava
*Assistant Examiner* — Hermon Asres
(74) *Attorney, Agent, or Firm* — Kramer Amado, P.C.

(57) ABSTRACT

Various embodiments provide a method and apparatus for providing adaptive self-tuned routing within a network. In particular, one or more path selection values are adaptable to the changing network utilization and are configured to balance the influence of a first objective and a second objective on the path selection. Advantageously, balancing the influence of the first and second objectives on path selection provides improved efficiency and improved revenue generating capacity when compared to conventional routing methods.

16 Claims, 6 Drawing Sheets

(56) References Cited

U.S. PATENT DOCUMENTS

2014/0362686 A1* 12/2014 Jogalekar ............... H04L 47/12
370/229

OTHER PUBLICATIONS

J. Moy, "OSPF Version 2", RFC: 2328, Network Working Group, Ascend Communications, Inc., Apr. 1998, 244 pages.

JP Vasseur, Ed. and JL le Roux, Ed., "Path Computation Element (PCE) Communication Protocol (PCEP)", RFC: 5440, Network Working Group, Cisco Systems, France Telecom, Mar. 2009, 87 pages.

K. Kompella and Y. Rekhter, "Signalling Unnumbered Links in Resource ReSerVation Protocol—Traffic Engineering (RSVP-TE)", RFC: 3477, Network Working Group, Juniper Networks, Jan. 2003, 9 pages.

L. Berger, Editor, "Generalized Multi-Protocol Label Switching (GMPLS) Signaling Resource ReserVation Protocol—Traffic Engineering (RSVP-TE) Extensions", RFC: 3473, Network Working Group, Movaz Networks, Jan. 2003, 42 pages.

D. Awduche et al., "RSVP-TE: Extensions to RSVP for LSP Tunnels", RFC: 3209, Network Working Group, Movaz Networks, Inc., Juniper Networks, Inc., Procket Networks, Inc., Cosine Communications, Inc., Cisco Systems, Inc., Dec. 2001, 61 pages.

A. Farrel, et al., "A Path Computation Element (PCE)-Based Architecture", RFC: 4655, Network Working Group, Old Dog Consulting, Cisco Systems, Inc., AT&T, Aug. 2006, 40 pages.

"Capitalizing on IP/Optical Control Integration—Quantifying TCO Savings of Multilayer Protection and Restoration Leveraging a GMPLS Control Plane", Financial White Paper, Alcatel-Lucent White Paper, MKT2014128941EN (Jan.), 14 pages.

N. Buchbinder and Joseph (Seffi) Naor, "The Design of Competitive Online Algorithms via a Primal-Dual Approach—Chapter 9: Routing", Foundations and Trends in Theoretical Computer Science, vol. 3, Nos. 2-3 (2007), NOW Publishers, 2009. Available online at: http://www.tau.ac.il/~nivb/download/pd-survey.pdf. 174 pages.

International Search Report for International Patent Application No. PCT/US2016/031005 dated Aug. 19, 2016.

Lin, et al., A Minimax Utilization Routing Algorithm in Networks With Single Path Routing, Proceedings of the Global Communications Conference, New York, IEEE, vol. 2 of 04, pp. 1067-1071, Nov. 29, 1993.

* cited by examiner

100

200

400

500

600

METHOD AND APPARATUS FOR SELF-TUNED ADAPTIVE ROUTING

TECHNICAL FIELD

The invention relates generally to methods and apparatus for routing data through a network.

BACKGROUND

This section introduces aspects that may be helpful in facilitating a better understanding of the inventions. Accordingly, the statements of this section are to be read in this light and are not to be understood as admissions about what is in the prior art or what is not in the prior art.

In some known routing schemes, IP/MPLS networks use link-state protocols such as Open Shortest Path First (OSPF) and Intermediate System-to-Intermediate System (IS-IS) to route Label Switched Paths. In some of these solutions, paths are selected based on a determined minimum hop count and in others of these solutions, paths are selected based on a determined minimum maximum link utilization.

SUMMARY OF ILLUSTRATIVE EMBODIMENTS

Some simplifications may be made in the following summary, which is intended to highlight and introduce some aspects of the various exemplary embodiments, but such simplifications are not intended to limit the scope of the inventions. Detailed descriptions of a preferred exemplary embodiment adequate to allow those of ordinary skill in the art to make and use the inventive concepts will follow in later sections Various embodiments provide a method and apparatus for providing adaptive self-tuned routing within a network. In particular, one or more path selection values are adaptable to the changing network utilization and are configured to balance the influence of a first objective and a second objective on the path selection. Advantageously, balancing the influence of the first and second objectives on path selection provides improved efficiency and improved revenue generating capacity when compared to conventional routing methods.

In a first embodiment, an apparatus is provided for selecting a path through a plurality of nodes interconnected via a plurality of links. The apparatus includes a data storage; and a processor communicatively connected to the data storage. The processor is programmed to: receive a connection request; update a first objective information based on the connection request and a first objective, the first objective information being associated with the plurality of links; update a second objective information based on the connection request and a second objective, the second objective information being associated with the plurality of links; determine a first utilization factor based on the first objective information; determine a second utilization factor based on the second objective information; and determine one or more path selection values based on the first utilization factor and the second utilization factor. Where the one or more path selection values are configured to bias selection of the path to either the first objective or the second objective.

In a second embodiment, a method is provided for selecting a path through a plurality of nodes interconnected via a plurality of links. The method include: a receiving a connection request; updating a first objective information based on the connection request and a first objective, the first objective information being associated with the plurality of links; updating a second objective information based on the connection request and a second objective, the second objective information being associated with the plurality of links; determining a first utilization factor based on the first objective information; determining a second utilization factor based on the second objective information; and determining one or more path selection values based on the first utilization factor and the second utilization factor. Where the one or more path selection values are configured to bias selection of the path to either the first objective or the second objective.

In a third embodiment, a non-transitory computer-readable storage medium for selecting a path through a plurality of nodes interconnected via a plurality of links is provided. The storage medium includes instructions which, when executed by a computer, cause the computer to perform a method comprising: receiving a connection request; updating a first objective information based on the connection request and a first objective, the first objective information being associated with the plurality of links; updating a second objective information based on the connection request and a second objective, the second objective information being associated with the plurality of links; determining a first utilization factor based on the first objective information; determining a second utilization factor based on the second objective information; and determining one or more path selection values based on the first utilization factor and the second utilization factor. Where the one or more path selection values are configured to bias selection of the path to either the first objective or the second objective.

In some of the above embodiments, the connection request comprises a source node, a destination node, and a bandwidth requirement, the plurality of nodes comprising the source node and the destination node.

In some of the above embodiments, the first objective is a link utilization objective and the second objective is a network utilization objective.

In some of the above embodiments, the embodiment further includes, for updating the first objective information: determining a first objective path through the plurality of links based on the connection request and a minimum max-path distribution algorithm. Where the update of the first objective information is further based on the first objective path.

In some of the above embodiments, the embodiment further includes, for updating the second objective information: determining a second objective path through the plurality of links based on the connection request and a minimum hop-path distribution algorithm. Where the update of the second objective information is further based on the second objective path.

In some of the above embodiments, the first utilization factor is further based on an association between the first objective information and an actual bandwidth allocation on the plurality of links; and the second utilization factor is further based on an association between the second objective information and the actual bandwidth allocation on the plurality of links.

In some of the above embodiments, the first utilization factor is further based on a first maximum link utilization of an actual bandwidth allocation on the plurality of links and a second maximum link utilization associated with the first objective information; and the second utilization factor is further based on a first network utilization of the actual bandwidth allocation on the plurality of links and a second network utilization associated with the second objective information.

In some of the above embodiments, the one or more path selection values comprises a first path selection value, the first path selection value being based on a comparison between the first utilization factor and the second utilization factor.

In some of the above embodiments, the embodiment further includes: receiving a second connection request; and selecting the path based on the one or more path selection values and an actual bandwidth allocation on the plurality of links.

In some of the above embodiments, the embodiment further includes, for selecting the path: determining a plurality of candidate paths between a source node and a destination node; determining a plurality of path costs corresponding to the candidate paths based on the one or more path selection values, and a plurality of link utilization values associated with the plurality of candidate paths; and selecting the one of the plurality of candidate paths having the lowest corresponding path cost.

BRIEF DESCRIPTION OF THE DRAWINGS

Various embodiments are illustrated in the accompanying drawings, in which.

To facilitate understanding, identical reference numerals have been used to designate elements having substantially the same or similar structure or substantially the same or similar function.

DETAILED DESCRIPTION OF ILLUSTRATIVE EMBODIMENTS

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

Various embodiments provide a method and apparatus for providing adaptive self-tuned routing within a network. In particular, one or more path selection values are adaptable to the changing network utilization and are configured to balance the influence of a first objective and a second objective on the path selection. Advantageously, balancing the influence of the first and second objectives on path selection provides improved efficiency and improved revenue generating capacity when compared to conventional routing methods and enables service providers to generate more revenues in their existing networks by being able to accommodate more service requests with the installed network capacity and to improve service quality by reducing link congestion situations.

Figure 1:
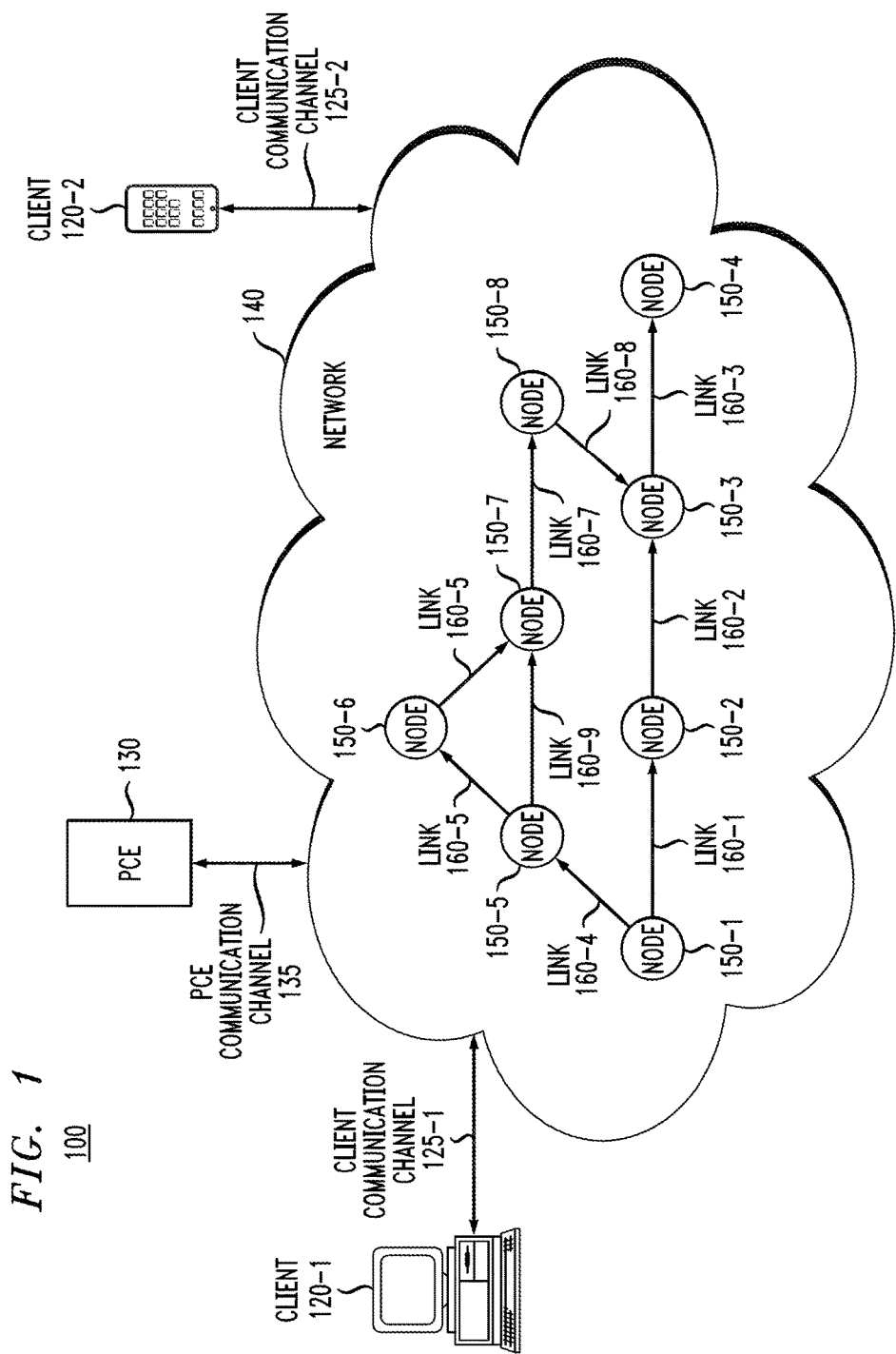
FIG. 1 illustrates a network that includes an embodiment of a system 100 for self-tuned adaptive routing.

FIG. 1 illustrates a network that includes an embodiment of a system 100 for self-tuned adaptive routing. The system 100 includes data being routed between two clients 120-1-120-2 (collectively, clients 120) over a communication path. The communication path includes client communication channels 125-1 and 125-2 (collectively, client communication channels 125) and network 140 which includes two or more nodes 150-1-150-8 (collectively, nodes 150) communicatively connected by one or more links 160-1-160-9 (collectively, links 160). Path computation engine (PCE) 130 receives a connection request (e.g., from one of clients 120, one of nodes 150 or a connection admission apparatus not shown for clarity), determines routing information for determining a routing path (e.g., between one of clients 120 to another of clients 120 or between one of nodes 150 and another of nodes 150) within a network of nodes (e.g., two or more of nodes 150 and appropriate ones of links 160) and communicates the routing information to appropriate ones of nodes 150. PCE 130 communicates to clients 120 or nodes 150 via PCE communication channel 135.

Clients 120 may include any type of communication device(s) capable of sending or receiving information over network 140 via one or more of client communication channels 125. For example, a communication device may be a thin client, a smart phone (e.g., client 120-*n*), a personal or laptop computer (e.g., client 120-1), server, network device, tablet, television set-top box, media player or the like. Communication devices may rely on other resources within exemplary system to perform a portion of tasks, such as processing or storage, or may be capable of independently performing tasks. It should be appreciated that while two clients are illustrated here, system 100 may include more clients. Moreover, the number of clients at any one time may be dynamic as clients may be added or subtracted from the system at various times during operation.

The communication channels 125 and 135 support communicating over one or more communication channels such as: wireless communications (e.g., LTE, GSM, CDMA, Bluetooth); WLAN communications (e.g., WiFi); packet network communications (e.g., IP); broadband communications (e.g., DOCSIS and DSL); storage communications (e.g., Fibre Channel, iSCSI), direct communication (e.g., when PCE 130 and one of nodes 150 are in the same apparatus) and the like. It should be appreciated that though depicted as a single connection, communication channels 125 and 135 may be any number or combinations of communication channels.

PCE 130 may be any apparatus capable of receiving connection requests (e.g., from one of clients 120, one of nodes 150 or a connection admission apparatus not shown for clarity), determining routing information for determining a routing path (e.g., between one of clients 120 to another of clients 120 or between one of nodes 150 and another of nodes 150) within a network of nodes (e.g., two or more of nodes 150) and communicating the routing information to appropriate ones of nodes 150. In particular, PCE 130 maintains information associated with two objectives to optimize network capacity utilization and determines one or more path selection values based on the objective information. The path selection values configured to be used in determining path selection. Objectives may be any suitable objective such as: (i) optimizing efficiency (i.e., attempting to minimize resource usage such as, for example, by attempting to minimize the total network bandwidth or by attempting to minimize the average link utilization or network utilization); (ii) providing utilization balance (i.e., attempting to avoid overloading any links to avoid congestion situations by attempting to minimize the maximum link utilization); or (iii) the like. Objective information may be any suitable information associated with the objectives such as, for example, maintaining a table of relevant information such as link allocation and capacity, network allocation maps or the like. In some embodiments, PCE 130 is configured to balance a link utilization objective and a network utilization objective. Advantageously, this balance may both avoid congested links and reduce network bandwidth consumption.

The network 140 includes any number of access and edge nodes 150 and network devices (not shown for clarity) and any number and configuration of links 160. Moreover, it should be appreciated that network 140 may include any combination and any number of wireless, or wire line networks including: LTE, GSM, CDMA, Local Area Network(s) (LAN), Wireless Local Area Network(s) (WLAN), Wide Area Network (WAN), Metropolitan Area Network (MAN), or the like. Nodes 150 may be any device capable of communicating with PCE 130 and routing data such as, for example: routers, switches, gateways, mobile packet switches (e.g., packet switched EPC), or the like.

It should be appreciated that though depicted as communicating between PCE 130 and ones of nodes 150 via network 140 and appropriate communication channels, PCE 130 may communicate with ones of nodes 150 through any suitable communication network or may reside in the same communication network or same apparatus as one or more of nodes 150.

In some embodiments, system 100 is a software defined network (SDN). In some embodiments, system 100 is an IP/MPLS networks.

Figure 2:
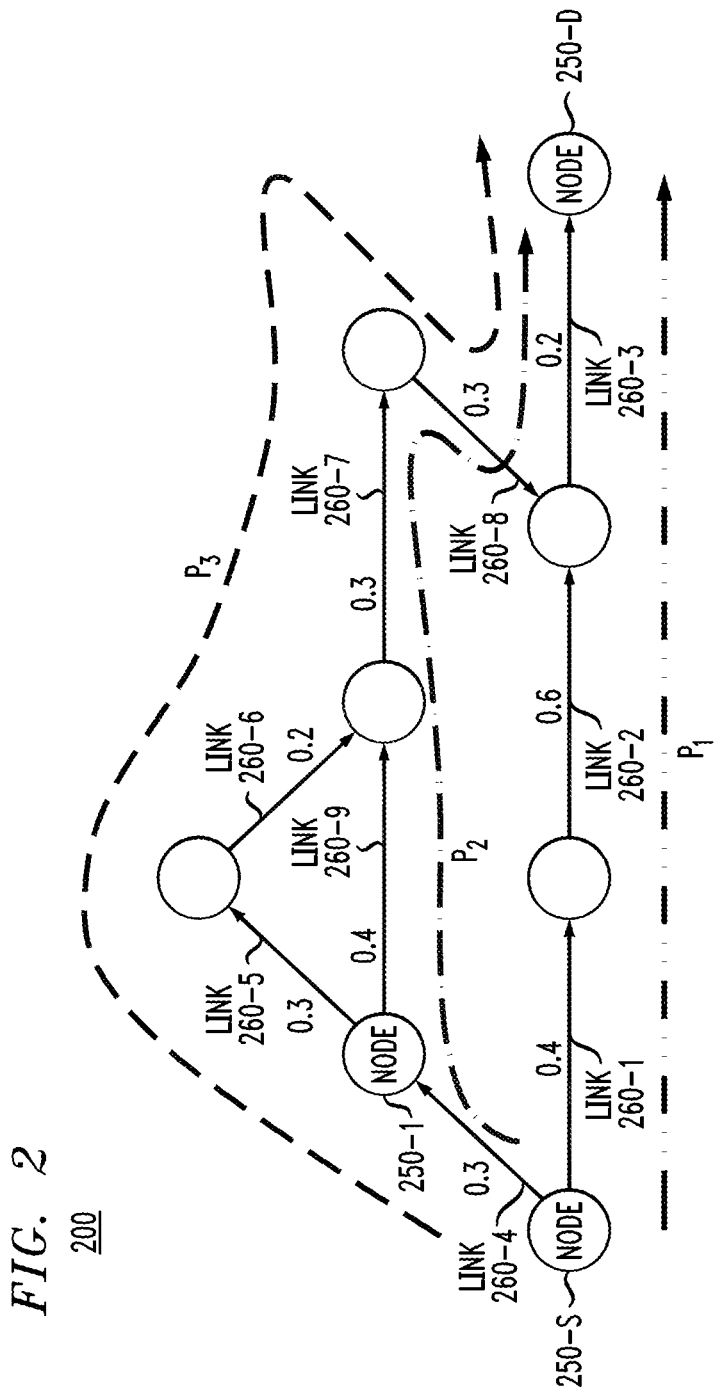
FIG. 2 depicts path selection over a network of nodes (e.g., nodes 150 of FIG. 1) and links (e.g., links 160 of FIG. 1) where maximizing network utilization is the objective.

FIG. 2 depicts path selection over a network of nodes (e.g., nodes 150 of FIG. 1) and links (e.g., links 160 of FIG. 1) where maximizing network utilization is the objective. Advantageously, maximizing network utilization has a direct relation to returns on investments and overall profitability for service providers. It should be appreciated that network capacity is a finite resource that is allocated on behalf of service requests made by clients (e.g., clients 120 of FIG. 1). As each service request represents an item of a certain volume and value, as the network fills up it becomes progressively harder to fill incoming service requests. As described herein, the PCE (e.g., PCE 130 of FIG. 1) is configured to balance a balance objective such as link utilization and an efficiency objective such as network utilization.

Referring to FIG. 2, Table 1 illustrates an example of the trade-off between balance and efficiency objectives for the given topology and link utilization. In FIG. 2, the paths P1, P2 and P3 represent the three distinct potential paths that may be selected to route date between source node 250-S and destination node 250-D in a network containing a number of nodes and links 260-1-260-9 (collectively, links 260). The values represent the link utilization of the link connecting nodes. For example, the link utilization between node 250-S and 250-1 is 0.3 or 30%. The illustrated nodes are collectively nodes 250. It should be appreciated that all of the individual nodes have not been labeled for purposes of clarity.

TABLE 1

Max Utilization and Hop Count of Paths in FIG. 2

| Path | Max Utilization | Number of Hops |
|------|-----------------|----------------|
| P1 | 60% (0.6) | Hops = 3 |
| P2 | 40% (0.4) | Hops = 5 |
| P3 | 30% (0.3) | Hops = 6 |

It should be appreciated that an algorithm minimizing link utilization may chose balance over efficiency, and thus may select path P3 to route data even though the path requires six (6) hops. While an algorithm minimizing hops (e.g., a constrained shortest path first (CSPF) routing protocol in OSPF and IS-IS networks) may chose efficiency over balance, and thus may select path P1 even though the higher congestion of link 260-2 (i.e., sixty percent (60%)) may create a risk to lock-out links for future requests. It should be further appreciated that the longer routes (i.e., more hops) may also negatively impact network utilization and ROI.

Figure 3:
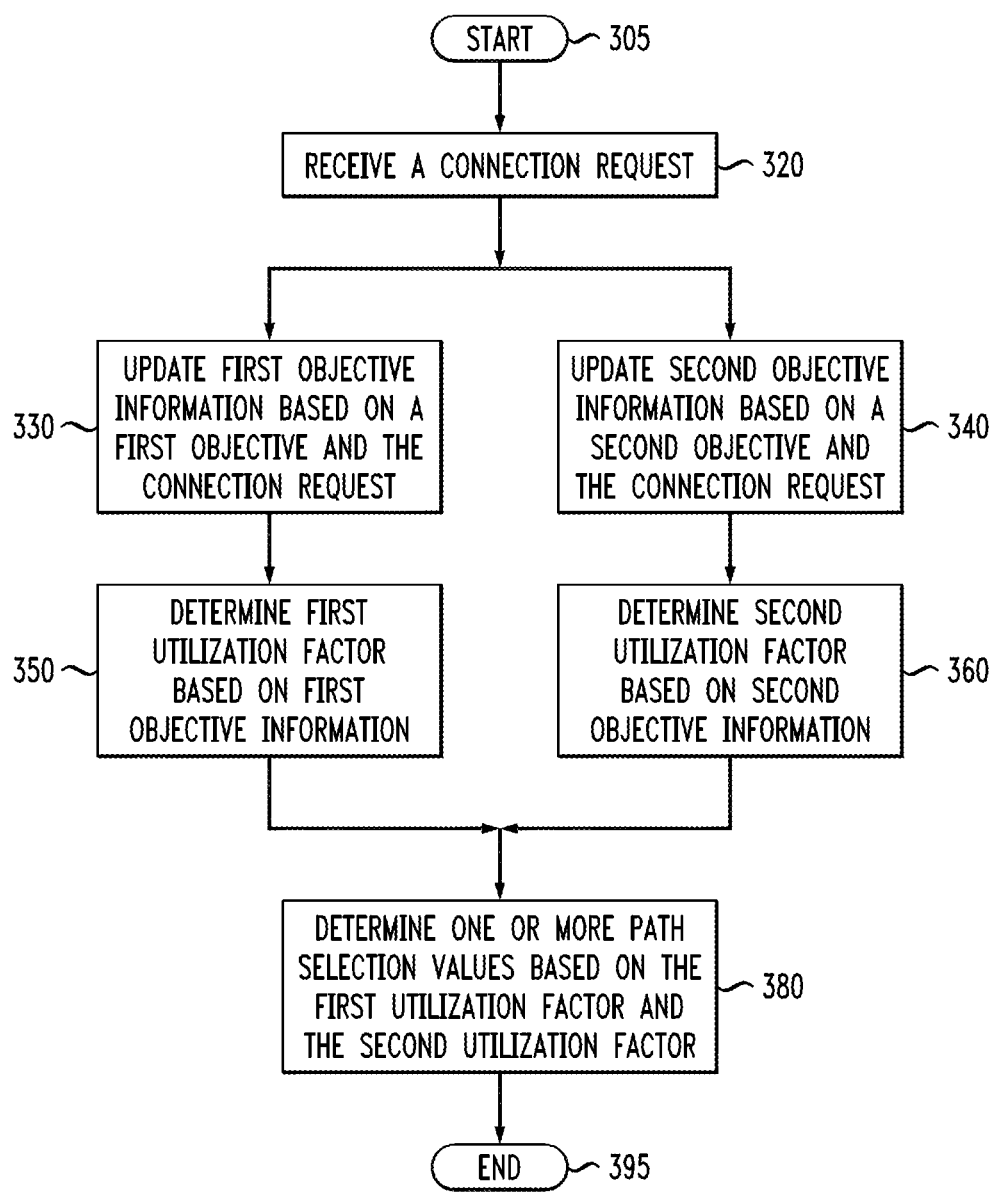
FIG. 3 depicts a flow chart illustrating an embodiment of a method 300 for an apparatus (e.g., PCE 130 of FIG. 1) to determine one or more path selection values associated with selecting a path over a network of nodes (e.g., nodes 150 of FIG. 1 or nodes 250 of FIG. 2) interconnected by links (e.g., links 160 of FIG. 1 or links 260 of FIG. 2) based on a first and second objectives.

FIG. 3 depicts a flow chart illustrating an embodiment of a method 300 for an apparatus (e.g., PCE 130 of FIG. 1) to determine one or more path selection values associated with selecting a path over a network of nodes (e.g., nodes 150 of FIG. 1 or nodes 250 of FIG. 2) interconnected by links (e.g., links 160 of FIG. 1 or links 260 of FIG. 2) based on a first and second objectives. The method starts at step 305 and includes: receiving a connection request (e.g., from one of clients 120 of FIG. 0.1 or one of nodes 150 of FIG. 1 or nodes 250 of FIG. 2) (step 320); updating first objective information based on a first objective and the connection request (step 330); updating second objective information based on a second objective and the connection request (step 340); determining a first utilization factor based on the first objective information (step 350); determining a second utilization factor based on the second objective information (step 360); determining one or more path selection values based on the first utilization factor and the second utilization factor (step 380); and ending at step 295.

In the method 300, the step 320 includes receiving a connection request (e.g., from one of clients 120 of FIG. 1 or one of nodes 150 of FIG. 1 or nodes 250 of FIG. 2). In particular, a connection request includes information such as a source node, a destination node and a bandwidth associated with the request. For example, referring to FIG. 2, a request may identify node 250-S, node 250-D and a bandwidth of 10 mbs. It should be appreciated that the connection request may be received in any suitable manner such as, for example, in a connection request from the requesting client, in a message from another apparatus (e.g., an apparatus performing connection admission control), or locally (e.g., if the PCE is in the same apparatus as a node or connection admission control apparatus).

In the method 300, the step 330 includes updating first objective information based on a first objective and the connection request. In particular, the first objective information is a copy of the bandwidth that would have been reserved for the links within the network of nodes (e.g., links 260 of FIG. 2) using allocation based on the first objective.

In the method 300, the step 340 includes updating second objective information based on a second objective and the connection request. In particular, the second objective information is a copy of the bandwidth that would have been reserved for the links within the network of nodes (e.g., links 260 of FIG. 2) using allocation based on the second objective.

In the method 300, the step 350 includes determining a first utilization factor based on the first objective information. In particular, the first utilization factor characterizes the utilization of the links within the network of nodes when allocated based on the first objective.

In the method 300, the step 360 includes determining a second utilization factor based on the second objective information. In particular, the second utilization factor characterizes the utilization of the links within the network of nodes when allocated based on the second objective.

In the method 300, the step 380 includes determining one or more path selection values based on the first utilization factor and the second utilization factor. In particular, the one or more path selection values are adaptable to the changing network utilization and are configured to balance the influence of the first and second objectives on the path selection. It should be appreciated that balancing the influence of the first and second objectives on path selection provides adaptive self-tuned routing within the network.

In some embodiments of the steps 330 and 340, the first objective is a link utilization objective and the second objective is a network utilization objective.

In some embodiments of the step 330, the first objective information is a copy of the bandwidth reserved for the links within the network of nodes (e.g., links 260 of FIG. 2) using allocation based on balancing link utilization (e.g., a minimum max-path distribution algorithm). For example, a new path is selected for an incoming connection request based on an objective of minimizing the maximum link utilization for links within the network of nodes and the first objective information is updated with the new path.

In some embodiments of the step 340, the second objective information is a copy of the bandwidth reserved for the links within the network of nodes (e.g., links 260 of FIG. 2) using allocation based on network utilization (e.g., a minimum hop distribution algorithm). For example, a new path is selected for an incoming connection requests based on an objective of minimizing the number of hops of the path satisfying the connection request and the second objective information is updated with the new path.

For example, referring to FIG. 2 and Table 2, the table lists an exemplary system at a point in time. In furthering the example, assume that a request to establish a connection between source node 250-S and destination node 250-D requiring 10 mbs has been received (e.g., in step 320).

The first objective information is updated based on choosing a path using a minimum max-path distribution algorithm. Referring to the first objective information in the table (e.g., f(l)(obj.1)), the highest link utilization on path P3 is link 260-5 which is 0.40 compared to the highest link utilization on path P1 being on link 260-2 having a link utilization of 0.45 and the highest link utilization on path P2 being on link 260-9 having a link utilization of 0.45). Since P3 has the lowest maximum link utilization, the links in path P3 in the first objective information (e.g., f(l)(obj.1)) are updated with the received connection request. For example, f(link 260-3)(obj.1) is updated from 250 MBS to 260 MBS; f(link 260-4)(obj.1) is updated from 375 MBS to 385 MBS; f(link 260-5)(obj.1) is updated from 200 MBS to 210 MBS; f(link 260-6)(obj.1) is updated from 150 MBS to 160 MBS; f(link 260-7)(obj.1) is updated from 375 MBS to 385 MBS; and f(link 260-8)(obj.1) is updated from 375 MBS to 385 MBS.

Similarly, the second objective information is updated based on choosing a path using a minimum hop-path distribution algorithm. Referring to Table 1, path P1 is chosen because path P1 has only 3 hops while path P2 has 5 hops and path P3 has 6 hops. Since P1 has the lowest hop count, the links in path P1 in the second objective information (e.g., f(l)(obj.2)) are updated with the received connection request. For example, f(link 260-1obj.2 is updated from 275 MBS to 285 MBS; f link 260-2obj.2 is updated from 375 MBS to 385 MBS; and f(link 260-3) (obj.2) is updated from 200 MBS to 210 MBS.

TABLE 2

Example Network State of FIG. 2

| Link | ∈ path | f(l) (actual) (MBS)(util) | f(l) (obj. 1) (MBS)(util) | f(l) (obj. 2) (MBS)(util) | u(l) (MBS) |
|---|---|---|---|---|---|
| 260-1 | P1 | 200 (0.4) | 125 (0.25) | 275 (0.55) | 500 |
| 260-2 | P1 | 300 (0.6) | 225 (0.45) | 375 (0.75) | 500 |
| 260-3 | P1, P2, P3 | 200 (0.2) | 250 (0.25) | 200 (0.2) | 1000 |
| 260-4 | P2, P3 | 300 (0.3) | 375 (0.375) | 225 (0.225) | 1000 |
| 260-5 | P3 | 150 (0.3) | 200 (0.4) | 75 (0.15) | 500 |
| 260-6 | P3 | 100 (0.2) | 150 (0.3) | 25 (0.05) | 500 |
| 260-7 | P2, P3 | 300 (0.3) | 375 (0.375) | 225 (0.225) | 1000 |
| 260-8 | P2, P3 | 300 (0.3) | 375 (0.375) | 225 (0.225) | 1000 |
| 260-9 | P2 | 200 (0.4) | 225 (0.45) | 200 (0.4) | 500 |
| Network Utilization | | 2050 (0.315) | 2525 (0.389) | 1825 (.281) | 6500 | where:
Link=a list of the links in the network of FIG. 2;
εpath=the membership for each of the links in paths P1, P2, or P3 in FIG. 2;
f(l)(actual))=the actual network allocation of the traffic as shown in FIG. 2
f(l)(obj.1))=a copy of the first objective information representing the network allocation had connections been routed based on a link optimization objective (e.g., a minimum max-path distribution algorithm);
f(l)(obj.2))=a copy of the second objective information representing the network allocation had connections been routed based on a network optimization objective (e.g., a minimum hop-path distribution algorithm); and
u(l)=the capacity of the link "l".

In some embodiments of the steps 350 and 360, the first utilization factor is based on an association between first objective information and the actual network allocation of the traffic and the second utilization factor is based on an association between second objective information and the actual network allocation of the traffic. In some of these embodiments, the first utilization factor is based on how close the actual network allocation is to the first objective as represented by the first objective information and the second utilization factor is based on how close the actual network allocation is to the second objective as represented by the second objective information.

In some embodiments of the step 350 where the first objective is a link utilization objective, the first utilization factor is based on the maximum link utilization value of the links in the network of nodes. In some of these embodiments, the first utilization factor is based on the maximum link utilization value of the links in the actual network allocation and the maximum link utilization value of the links in the first objective information. In some of these embodiments, the first utilization factor is based on equation [Eq. 1].

$$\text{first utilization factor} = \max(\text{utilization}(l)(\text{actual}))/\max(\text{utilization}(l)(\text{obj.1})); \forall \text{links } l \quad [\text{Eq. 1}]$$

where:
utilization(l)(actual)=the actual bandwidth utilization of link "l" in the actual network allocation of the traffic;
utilization(l)(obj.1)=the bandwidth utilization of link "l" in the first objective information; and
∀ links l=for all links "l" in the network of nodes.

For example, referring to Table 2, the first utilization factor is 0.6/0.45=1.33 since the maximum link utilization in the actual network allocation is 0.6 (e.g., link 260-2 has a link utilization value of 0.6) and the maximum link utilization in the first objective information is 0.45 (e.g., links 260-2 and 260-9 have a link utilization value of 0.45). It should be appreciated that the first utilization factor may be based on the maximum link utilization of the first objective information prior to or after the first objective information has been updated.

In some embodiments of the step 360 where the second objective is a network utilization objective, the second utilization factor is based on the network utilization of links in the network of nodes. In some of these embodiments, the second utilization factor is based on the network utilization of the links in the actual network allocation and the network utilization of the links in the second objective information. In some of these embodiments, the second utilization factor is based on equation [Eq. 2].

$$\text{second utilization factor} = \left(\frac{\Sigma f(l)(\text{actual})}{\Sigma u(l)}\right) / \left(\frac{\Sigma f(l)(\text{obj. 2})}{\Sigma u(l)}\right); \quad [\text{Eq. 2}]$$
$$\forall \text{ links } l$$

where:
f(l)(actual)=the actual bandwidth allocated to link "l" in the actual network allocation of the traffic;
u(l)=the capacity of link "l";
utilization(l)(obj.1)=the bandwidth utilization of link "l" in the first objective information; and
∀ links l=for all links "l" in the network of nodes.

For example, referring to Table 2, the second utilization factor is 0.315/0.281=1.12 since the network utilization in the actual network allocation is 0.315 (e.g., 2050 MBS allocated of 6500 MBS capacity) and the network utilization in the second objective information is 0.281 (e.g., 1825 MBS allocated of 6500 MBS capacity). It should be appreciated that the second utilization factor may be based on the network utilization of the second objective information prior to or after the second objective information has been updated.

In some embodiments of the step 380, the first path selection value (i.e., α) is based on the first utilization factor and the second utilization factor. In some of these embodiments, α is adaptively tuned based on how close the actual network allocation is to the first or second objective as represented by the corresponding first and second objective information. In some of these embodiments, the first path selection value is based on equations [Eq. 3] and [Eq. 4]. It should be appreciated that the first path selection value α is configured based on the path selection algorithm to bias the path selection algorithm to the appropriate selection objective (e.g., the first or second objective).

if(first util.factor+threshold)<second util.factor;
$$\alpha = \alpha/M \quad [\text{Eq. 3}]$$

if(second util.factor+threshold)<first util.factor;
$$\alpha = \alpha * M \quad [\text{Eq. 4}]$$

where:
α=the path selection value that represents the balance between the first objective and the second objective;
threshold=an optional threshold value where if the first and second utilization factor are within the threshold value, α is not changed; and
M=a parameter for controlling the change of α. Any suitable value may be used. For example, a value of 1.2 has been determined to be suitable.

In some embodiments of the method 300, one or more of the first objective information, the second objective information, the first utilization factor, the second utilization factor or the one or more path selection values are further based on administrative link metrics or explicit route constraints. For example, a metric constraining a connection request to 5 or less hopes would not chose path P3 of FIG. 2. In some of these embodiments, the metric may be based on a type of data (e.g., real-time data such as voice or video or latency sensitive data may be treated differently).

Figure 4:
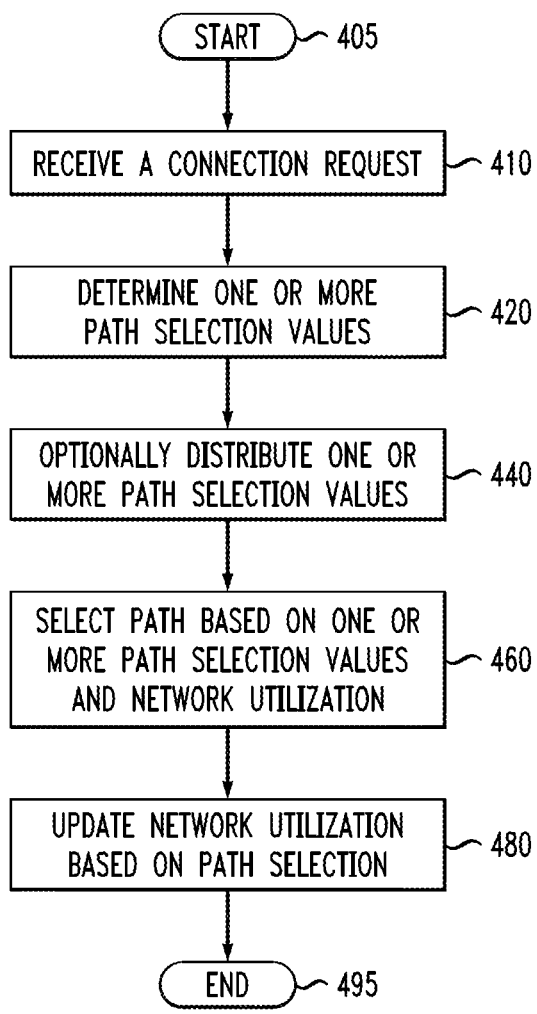
FIG. 4 s a flow chart illustrating an embodiment of a method 400 for an apparatus or a system (e.g., PCE 130 of FIG. 1 or PCE 130 and one or more of nodes 150 of FIG. 1) to select a path using self-tuned adaptive routing.

FIG. 4 depicts a flow chart illustrating an embodiment of a method 400 for an apparatus or a system (e.g., PCE 130 of FIG. 1 or PCE 130 and one or more of nodes 150 of FIG. 1) to select a path using self-tuned adaptive routing. The method starts at step 405 and includes: receiving a connection request (step 410); determining one or more path section values (step 420); optionally distributing the one or more path selection values; (step 440); selecting a path based on the one or more path selection values and the and the actual network allocation (e.g., bandwidth) of the traffic on the links (step 460); updating the network utilization based on the path selection (step 480); and ending at step 495.

In the method 400, the step 410 includes receiving a connection request (e.g., by PCE 130 of FIG. 1) as described herein, particularly as illustrated in step 320 of FIG. 3.

In the method 400, the step 420 includes determining one or more path section values (e.g., by PCE 130 of FIG. 1) as described herein, particularly as illustrated in steps 330, 340, 350, 360 and 380 of FIG. 3.

The method 400 optionally includes step 440. Step 440 includes distributing the one or more path selection values (e.g., by PCE 130 of FIG. 1). In particular, in embodiments where the path selection in step 460 is not being performed by the same apparatus that determined the one or more path selection values in step 420 (e.g., by one or more of nodes 150 instead of PCE 130), then the apparatus determining the one or more path selection values distributes the path selection values as appropriate. Distribution may be by any suitable method such as, for example, transmitting a message with the value or storing the one or more path selection values in a central location accessible by the apparatus selecting the path in step 460.

In the method 400, the step 460 includes selecting a path based on the one or more path selection values and the actual network allocation (e.g., bandwidth) of the traffic on the links. In some embodiments, path selection is based on estimating link costs based on link utilization and the one or more path selection values. In some of these embodiments, the selected path is the path having the lowest sum of link costs. In some of these embodiments, the path selection is based on equations [Eq. 5], [Eq. 6] and [Eq. 7]. It should be appreciated that in embodiments where the first objective is link utilization and the second objective is network utilization and the first objective information is updated based on a min-max algorithm and the second objective information is updated based on a min-hop algorithm, as $\alpha$ approaches 0, [Eq. 5] performs similar to a min-hop algorithm and as $\alpha$ approaches $\infty$, [Eq. 5] performs similar to a min-max algorithm. Thus, adaptively self-tuning the path selection value $\alpha$ achieves the objective of balancing path selection between the first and second objectives.

$$c(l) = e^{\left(\alpha\left[\frac{f(l)}{u(l)}\right]-1\right)} \qquad [\text{Eq. 5}]$$

$$c(p) = \Sigma c(l); \forall\, l \in \text{path}(p) \qquad [\text{Eq. 6}]$$

$$\text{selected path} = \min(c(p)); \forall\, \text{paths}\, p \qquad [\text{Eq. 7}]$$

where:
$c(l)$=the cost of routing the request on link "l";
$\alpha$=the path selection value that represents the balance between the first objective and the second objective;
$f(l)$(actual)=the actual bandwidth allocated to link "l" in the actual network allocation of the traffic;
$u(l)$=the capacity of link "l"; and
$c(p)$=the cost of routing the request on path "p".

In the method 400, the step 480 updating the network utilization based on the path selection. For example, actual network allocation of the traffic is updated based on the selected path. Referring to FIG. 2 and Table 2, if path P2 is selected, the values of $f(l)$(actual) for path P2 are updated with the received connection request. For example, f(link 260-3)(actual) is updated from 200 MBS to 210 MBS; f(link 260-4) (actual) is updated from 300 MBS to 310 MBS; f(link 260-7)(actual) is updated from 300 MBS to 310 MBS; f(link 260-8) (actual) is updated from 300 MBS to 310 MBS; and f(link 260-9)(actual) is updated from 200 MBS to 210 MBS.

Figure 5:
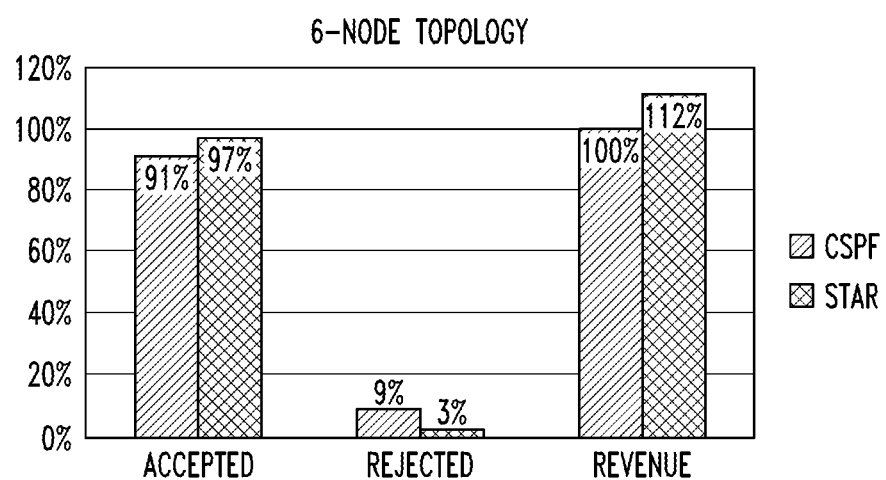
FIG. 5 illustrates exemplary results of a 6-node topology comparing an embodiment of the self-tuned adaptive routing system as described herein to conventional constrained shortest path first solutions.
Figure 6:
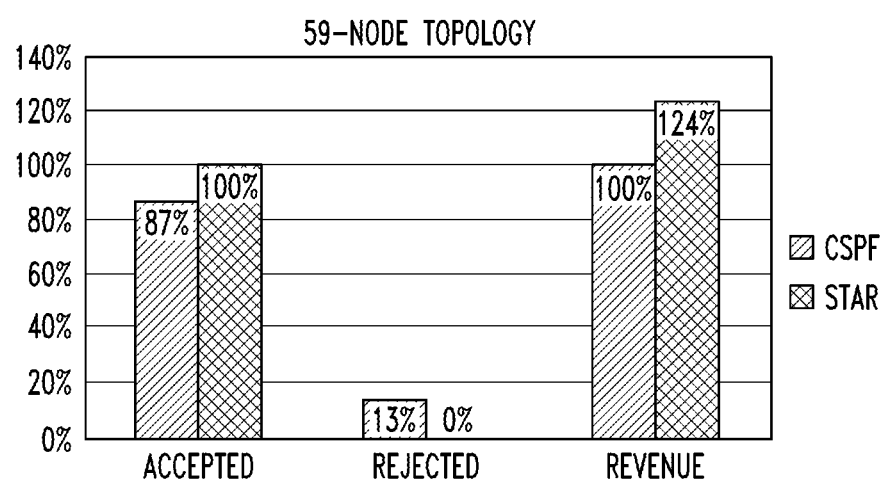
FIG. 6 illustrates exemplary results of a 59-node topology comparing an embodiment of the self-tuned adaptive routing system as described herein to conventional constrained shortest path first solutions.

The inventors have done analysis on 6-node and 59-node systems and have found improved efficiency and improved revenue generating capacity as illustrated in FIGS. 5 and 6 when comparing embodiments of the self-tuned adaptive routing system as described herein and incorporated into Bell Labs STAR algorithm to conventional constrained shortest path first (CSPF) solutions.

Although primarily depicted and described in a particular sequence, it should be appreciated that the steps shown in methods 300 and 400 may be performed in any suitable sequence. Moreover, the steps identified by one step may also be performed in one or more other steps in the sequence or common actions of more than one step may be performed only once. For example, steps 340 and 360 of FIG. 3 may be performed after steps 330 and 350 of FIG. 3.

It should be appreciated that steps of various above-described methods can be performed by programmed computers. Herein, some embodiments are also intended to cover program storage devices, e.g., data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable data storage media. The embodiments are also intended to cover computers programmed to perform said steps of the above-described methods.

Figure 7:
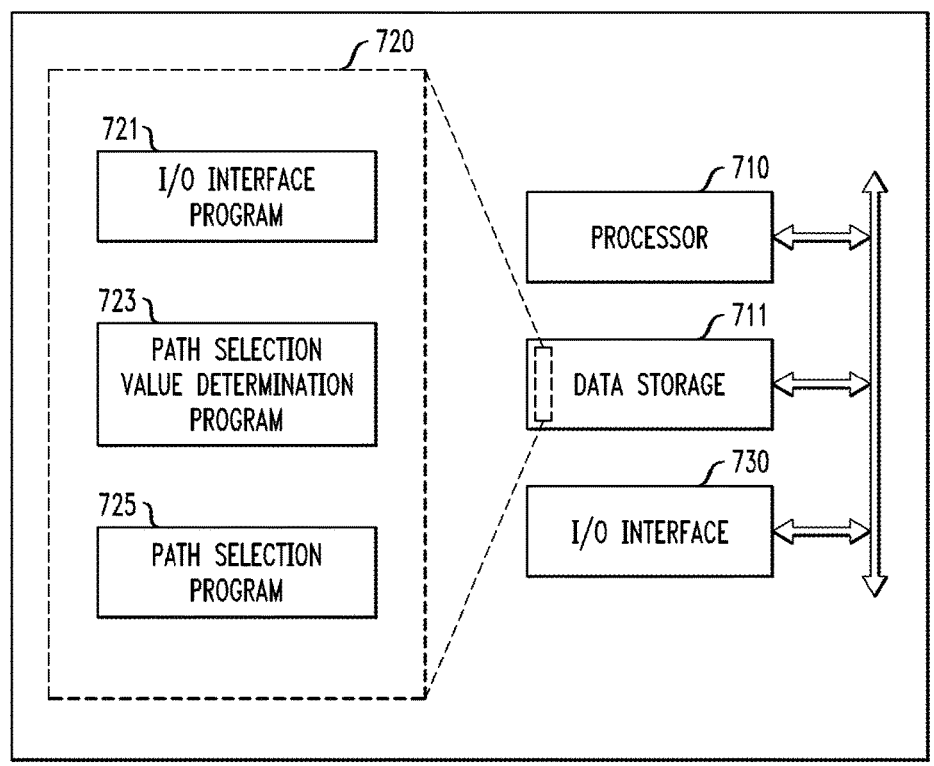
FIG. 7 schematically illustrates an embodiment of an apparatus 700 such as one of PCE 130 or one of nodes 150 of FIG. 1.

FIG. 7 schematically illustrates an embodiment of an apparatus 700 such as one of PCE 130 or one of nodes 150 of FIG. 1. The apparatus 700 includes processor 710, data storage 711, and I/O interface 730.

The processor 710 controls the operation of the apparatus 700. The processor 710 cooperates with the data storage 711.

The data storage 711 stores appropriate ones of programs 720 executable by the processor 710. Data storage 711 may also optionally store program data such as first or second objectives, first or second objective information, the one or more path selection values or the like as appropriate.

The processor-executable programs 720 may include an I/O interface program 721, a path selection value determination program 723, or a path selection program 725. Processor 710 cooperates with processor-executable programs 720.

The I/O interface 730 cooperates with processor 710 and I/O interface program 721 to support communications over communication channels 125 or 135 of FIG. 1 as appropriate and as described above.

The path selection value determination program 723 performs the steps of FIG. 3 or steps 410 and 420 of FIG. 4 as appropriate and as described above.

The path selection program 725 performs steps 440, 460 and 480 of FIG. 4 as described above.

In some embodiments, the processor 710 may include resources such as processors/CPU cores, the I/O interface 730 may include any suitable network interfaces, or the data storage 711 may include memory or storage devices. Moreover the apparatus 700 may be any suitable physical hardware configuration such as: one or more server(s), blades consisting of components such as processor, memory, network interfaces or storage devices. In some of these embodiments, the apparatus 700 may include cloud network resources that are remote from each other.

In some embodiments, the apparatus 700 may be virtual machine. In some of these embodiments, the virtual machine may include components from different machines or be geographically dispersed. For example, the data storage 711 and the processor 710 may be in two different physical machines.

When processor-executable programs 720 are implemented on a processor 710, the program code segments combine with the processor to provide a unique device that operates analogously to specific logic circuits.

Although depicted and described herein with respect to embodiments in which, for example, programs and logic are stored within the data storage and the memory is communicatively connected to the processor, it should be appreciated that such information may be stored in any other suitable manner (e.g., using any suitable number of memories, storages or databases); using any suitable arrangement of memories, storages or databases communicatively connected to any suitable arrangement of devices; storing information in any suitable combination of memory(s), storage(s) or internal or external database(s); or using any suitable number of accessible external memories, storages or databases. As such, the term data storage referred to herein is meant to encompass all suitable combinations of memory(s), storage(s), and database(s).

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the FIGs., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated that any block diagrams herein represent conceptual views of illustrative circuitry embodying the principles of the invention. Similarly, it should be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus for selecting a path through a plurality of nodes interconnected via a plurality of links, the apparatus comprising:
a data storage; and
a processor communicatively connected to the data storage, the processor being configured to receive a connection request, update a first objective information based on the connection request and a balance objective, the first objective information being associated with the plurality of links, update a second objective information based on the connection request and a efficiency objective, the efficiency objective information being associated with the plurality of links, determine a first utilization factor based on an association between the first objective information and an actual bandwidth allocation on the plurality of links, determine a second utilization factor based on an association between the second objective information and the actual bandwidth allocation on the plurality of links, and determine a first path selection value based on the first utilization factor and the second utilization factor to select the path based upon a bias that favors either the balance objective or the efficiency objective, wherein the first path selection value changes after either the first utilization factor or the second utilization factor exceeds a threshold value, and the change in the first path selection value is based on a comparison between the first utilization factor, the second utilization factor, and the threshold.

2. The apparatus of claim 1, wherein the connection request comprises a source node, a destination node, and a bandwidth requirement, the plurality of nodes comprising the source node and the destination node.

3. The apparatus of claim 1, wherein the balance objective is a link utilization objective and the efficiency objective is a network utilization objective.

4. The apparatus of claim 3, wherein the update of the first objective information comprises configuring the processor to determine a first objective path through the plurality of links based on the connection request and a minimum max-path distribution algorithm, wherein the update of the first objective information is further based on the first objective path.

5. The apparatus of claim 4, wherein the update of the second objective information comprises configuring the processor to determine a second objective path through the plurality of links based on the connection request and a minimum hop-path distribution algorithm, wherein the update of the second objective information is further based on the second objective path.

6. The apparatus of claim 1, wherein the first utilization factor is further based on a first maximum link utilization of an actual bandwidth allocation on the plurality of links and a second maximum link utilization associated with the first objective information, and the second utilization factor is further based on a first network utilization of the actual bandwidth allocation on the plurality of links and a second network utilization associated with the second objective information.

7. The apparatus of claim 1, wherein the processor is further configured to receive a second connection request, and select the path based on the first path selection value and an actual bandwidth allocation on the plurality of links.

8. The apparatus of claim 7, wherein the selection of the path comprises configuring the processor to determine a plurality of candidate paths between a source node and a destination node, determine a plurality of path costs corresponding to the candidate paths based on the first path selection value, and a plurality of link utilization values associated with the plurality of candidate paths, and select the one of the plurality of candidate paths having the lowest corresponding path cost.

9. A method for selecting a path through a plurality of nodes interconnected via a plurality of links, the method comprising:
    at a processor communicatively connected to a data storage, receiving a connection request;
    updating, by the processor in cooperation with the data storage, a first objective information based on the connection request and a balance objective, the first objective information being associated with the plurality of links;
    updating, by the processor in cooperation with the data storage, a second objective information based on the connection request and an efficiency objective, the second objective information being associated with the plurality of links;
    determining, by the processor in cooperation with the data storage, a first utilization factor based on an association between the first objective information and an actual bandwidth allocation on the plurality of links;
    determining, by the processor in cooperation with the data storage, a second utilization factor based on an association between the second objective information and the actual bandwidth allocation on the plurality of links; and
    determining, by the processor in cooperation with the data storage, a first selection value based on the first utilization factor and the second utilization factor to select the path based upon a bias that favors either the balance objective or the efficiency objective, wherein the first path selection value changes after either the first utilization factor or the second utilization factor exceeds a threshold value, and the change in the first path selection value is based on a comparison between the first utilization factor, the second utilization factor, and the threshold.

10. The method of claim 9, wherein the connection request comprises a source node, a destination node, and a bandwidth requirement, the plurality of nodes comprising the source node and the destination node.

11. The apparatus of claim 9, wherein the balance objective is a link utilization objective and the efficiency objective is a network utilization objective.

12. The method of claim 9, wherein updating the first objective information comprises:
    determining, by the processor in cooperation with the data storage, a first objective path through the plurality of links based on the connection request and a minimum max-path distribution algorithm, wherein the update of the first objective information is further based on the first objective path.

13. The method of claim 12, wherein updating the first objective information comprises:
    determining, by the processor in cooperation with the data storage, a second objective path through the plurality of links based on the connection request and a minimum hop-path distribution algorithm, wherein the update of the second objective information is further based on the second objective path.

14. The method of claim 9, wherein the first utilization factor is further based on a first maximum link utilization of an actual bandwidth allocation on the plurality of links and a second maximum link utilization associated with the first objective information, and the second utilization factor is further based on a first network utilization of the actual bandwidth allocation on the plurality of links and a second network utilization associated with the second objective information.

15. The method of claim 9, wherein the method further comprises:
    receiving, by the processor in cooperation with the data storage, a second connection request; and
    selecting, by the processor in cooperation with the data storage, the path based on the first path selection value and an actual bandwidth allocation on the plurality of links.

16. A non-transitory computer-readable storage medium storing instructions which, when executed by a computer, cause the computer to perform a method, the method comprising:
    receiving a connection request;
    updating a first objective information based on the connection request and a balance objective, the first objective information being associated with the plurality of links;
    updating a second objective information based on the connection request and an efficiency objective, the second objective information being associated with the plurality of links;
    determining a first utilization factor based on an association between the first objective information and an actual bandwidth allocation on the plurality of links;
    determining a second utilization factor based on an association between the second objective information and the actual bandwidth allocation on the plurality of links; and
    determining a first path selection value based on the first utilization factor and the second utilization factor to select the path based upon a bias that favors either the balance objective or the efficiency objective, wherein the first path selection value changes after either the first utilization factor or the second utilization factor exceeds a threshold value, and the change in the first path selection value is based on a comparison between the first utilization factor, the second utilization factor, and the threshold.

* * * * *